United States Patent [19]
Sano: Konosuke et al.

[11] 3,929,573
[45] Dec. 30, 1975

[54] METHOD OF PREPARING L-TRYPTOPHAN
[75] Inventors: Sano: Konosuke, Machida; Koji Mitsugi, Yokohama, both of Japan
[73] Assignee: Ajinomoto Co., Inc., Tokyo, Japan
[22] Filed: Dec. 20, 1974
[21] Appl. No.: 534,640

[30] Foreign Application Priority Data
Dec. 29, 1973  Japan.................................. 49-455

[52] U.S. Cl..................................... 195/29; 195/96
[51] Int. Cl.²......................................... C12D 13/06
[58] Field of Search ............. 195/28, 29, 30, 47, 96

[56] References Cited
UNITED STATES PATENTS
3,808,101   4/1974   Enei et al.............................. 195/29

*Primary Examiner*—A. Louis Monacell
*Assistant Examiner*—Robert J. Warden
*Attorney, Agent, or Firm*—Hans Berman; Kurt Kelman

[57] ABSTRACT

The tryptophanase of Proteus, Ervinia, Escherichia, Pseudomonas, or Aerobacter which can cause reaction of indole and 5-hydroxyindole with serine to L-tryptophan and 5-hydroxy-L-trypotphan can cause an analogous reaction with β-chloro- and β-bromoalanine at a higher rate and with generally higher yields.

5 Claims, No Drawings

METHOD OF PREPARING L-TRYPTOPHAN

This invention relates to a method of preparing amino acids, and particularly to a method of preparing L-tryptophan and 5-hydroxy-L-tryptophan (hereinafter referred to as tryptophan and hydroxytryptophan).

Tryptophan is useful as an additive to feed and food, and tryptophan and hydroxytryptophan are both used in medicine.

It is known that tryptophan and hydroxytryptophan are produced from indole and 5-hydroxy-indole, respectively reacting with an α-amino acid such as serine or cysteine (Japanese Patent Publication No. 46348/1972) by the action of an enzyme produced by a microorganism of genus Proteus, Erwinia, Escherichia, Pseudomonas or Aerobacter.

It has now been found that the same enzyme catalyses the formation of tryptophan from indole and β-halogenoalanine, and hydroxytryptophan from 5-hydroxyindole and β-halogenoalanine.

According to the method of this invention, the yield of tryptophan or hydroxytryptophan is higher than in the known methods, and moreover, the reaction rate is very high as compared with the known methods.

The microorganisms capable of producing the enzyme belong to the genua Proteus, Erwinia, Escherichia, Pseudomonas, or Aerobacter. The microorganisms are cultured in entirely conventional media containing a carbon source, nitrogen source, inorganic ions, and preferably a minor organic nutrient. Addition of a small amount of tryptophan or 5-hydroxytryptophan promotes the production of enzyme activity.

Suitable carbon sources are carbohydrates or sugar-alcohols (such as glucose, fructose, sucrose, mannose, maltose, mannitol, xylose, galactose, starch, molasses, sorbitol, or glycerine), organic acids (such as acetic acid, citric acid, lactic acid, fumaric acid, or maleic acid) and alcohols (such as methanol, ethanol, propanol, or butanol). Nitrogen sources are conventional such as ammonium chloride, ammonium sulfate, ammonium phosphate, ammonium nitrate, ammonium carbonate, ammonium acetate, urea, ammonia water, of gaseous ammonia. Sometimes minor organic nutrients promote microbial growth and enzyme production. Such minor organic nutrients are vitamines, amino acids, and raw materials which contain those minor organic nutrients such as corn steep liquor, beef extract, peptone, casein-hydrolyzate, soyprotein-hydrolyzate, malt extract or yeast extract.

Inorganic ions such as potassium, sodium, calcium, magnesium, ferrous, manganese, copper, phosphate, sulfate are conventionally used.

Preferably 0.01 to 0.5 g/dl tryptophan or hydroxytryptophan are added to the medium to increase the enzyme activity.

When the microorganisms are cultured in the medium mentioned above for 2 to 7 days at pH 4 to 9, and at 27° to 40°C, the enzyme capable of producing tryptophan and hydroxytryptophan is accumulated in the cells or in the broth.

The cells or the broths themselves are used as an enzyme source. Freeze-dried cells, homogenate of cells, sonicate of cells, autolyzate of cells, cells treated with acetone and enzyme preparation are also used. In this invention the term "cells" contain those homogenate of cells and materials derived.

The isolation and purification of the enzyme and enzymological properties of the enzyme are disclosed in FEBS' 48 (1) 56 (1974) H. Yoshida et al.

The enzyme is a tryptophanase since it catalyses degradation of tryptophan to indole, pyruvate and ammonia.

The reaction mixture contains the enzyme or a source of the enzyme, β-chloroalanine, and indole or 5-hydroxyindole. Pyridoxal-5-phosphate is necessary as the co-enzyme when purified apo-enzyme is used. A reducing agent such as thiosulfate is preferably added to the reaction mixture to increase the yield of tryptophan or hydroxytryptophan.

The reaction mixture is held at 5° to 60°C and at pH 5 to 10 until indole or 5-hydroxyindole is substantially converted to tryptophan or hydroxytryptophan.

The tryptophan or hydroxytryptohan formed in the reaction mixture can be isolated and purified by conventional methods such as ion exchange chromatography, or precipitation at the isoelectric point.

The tryptophan and hydroxytryptophan products obtained in the following examples were identified by comparison with authentic samples of L-tryptophan and 5-hydroxy-L-tryptophan, resepctively.

EXAMPLE 1

Proteus morganii IFO 3848 was cultured in 60 ml batches of the following medium held in 500 ml flasks with shaking at 30°C for 20 hours.

| Medium: | | |
|---|---|---|
| L-tryptophan | 2 | g |
| $KH_2PO_4$ | 0.5 | g |
| $MgSO_4.7H_2O$ | 0.5 | g |
| $FeSO_4.7H_2O$ | 10 | mg |
| $MnSO_4.4H_2O$ | 7 | mg |
| corn steep liquor | 20 | ml |
| yeast extract | 2 | g |
| casein hydrolyzate | 5 | g |
| tap water | 1 | l |
| pH (KOH) | 7.0 | |

Cells were collected by centrifuging from 1 l combined culture broth thus obtained, and added to 1 l of 0.1% $NH_4Cl$–$NH_4OH$ buffer solution (pH 8.0) containing 20 g indole and 20 g β-chloro-L-alanine. The reaction mixture was held at 37°C for 20 hours with stirring. Twenty-four grams of L-tryptophan was produced (by microbiological assay method).

After dissolving of the precipitated tryptophan with NaOH, the reaction mixture was filtered to remove cells, adjusted to pH 4 with HCl, and passed through a column packed with active carbon. L-Tryptophan was eluted with 2N $NH_4OH$, the eluate was concentrated, and 20.2 g L-tryptophan crystals were obtained.

Cells of Aerobacter aerogenes ATCC 7256 or Pseudomonas perlurida ATCC 490 prepared as above were used in place of cells of Proteus morganii IFO 3848. In the case of ATCC 7256, 9.0 g L-tryptophan was produced, and in the case of ATCC 490, 19.1 g L-tryptophan was produced.

In comparison tests, β-chloro-L-alanine was replaced with 20 g L-serine, and 22.3 g, 8.0 g and 18.4 g of L-tryptophan were produced by the cells of Proteus morganii IFO 3848, aerobacter aerogenes ATCC 7256 and Pseudomonas perlurida ATCC 490, respectively.

EXAMPLE 2

Erwinia hervicola ATCC 21433 and Escherichia coli ATCC 206 were cultured as in Example 1.

Each culture broth thus obtained was mixed with 1 g/dl β-chloro-L-alanine and 1 g/dl indole, and held at 37°C for 44 hours with stirring. In the culture broth of ATCC 21433, 0.70 g/dl tryptophan was produced and 0.94 g/dl in the culture broth of ATCC 206.

When β-chloro-L-alanine was replaced with 1 g/dl L-serine, ATCC 21433 produced 0.62 g/dl tryptophan and ATCC 206 produced 0.78 g/dl tryptophan.

EXAMPLE 3

The basal medium mentioned below was mixed with 0.2 g/dl L-tryptophan (Medium A) or 0.2 g/dl 5-hydroxy-L-tryptophan (Medium B), 40 ml batches were placed in 500 ml flasks, and each batch was inoculated with Proteus morganii IFO 3848. Thereafter the flasks were held at 31°C for 20 hours with shaking.

| Basal medium: | | |
|---|---|---|
| corn steep liquor | 2.0 | ml/dl |
| $KH_2PO_4$ | 0.05 | g/dl |
| $MgSO_4.7H_2O$ | 0.05 | g/dl |
| $FeSO_4.7H_2O$ | 1 | mg/dl |
| $MnSO_4.4H_2O$ | 0.7 | mg/dl |
| yeast extract | 2.0 | g/dl |
| pH (KOH) | 7.5 | |

The culture broths thus obtained were mixed with 2 g/dl β-chloro-L-alanine, 2 g/dl indole and 0.2 g/dl potassium thiosulfate, and held at 37°C for 40 hours with shaking.

In the culture broth of Medium A, 2.3 g/dl L-tryptophan was found, and 1.8 g/dl tryptophan was found in the culture broth of Medium B.

EXAMPLE 4

Proteus morganii IFO 3848 was cultured in 100 ml batches of the medium mentioned below at 31.5°C for 20 hours. The combined culture broth (2l) was centrifuged and cells thus obtained were suspended in 0.05 M phosphate buffer (pH 6.0), and homogenized by means of a sonic oscillator. Supernatant of the sonicate was mixed with ammonium sulfate, and precipitated proteins were dialyzed and treated with protamine, and fractionated with DEAE-Sephadex and thereafter Sephadex G-150.

| Medium: | | |
|---|---|---|
| L-tryptophan | 0.2 | g/dl |
| $KH_2PO_4$ | 0.1 | g/dl |
| $MgSO_4.7H_2O$ | 0.05 | g/dl |
| $FeSO_4.7H_2O$ | 1 | mg/dl |
| $MnSO_4.4H_2O$ | 0.7 | mg/dl |
| corn steep liquor | 2 | ml/dl |
| yeast extract | 0.5 | g/dl |
| casein hydrolyzate | 0.5 | g/dl |
| pH (KOH) | 7.0 | |

The enzyme protein thus obtained (40 mg) was added to the reaction mixture mentioned below, and the mixture was held at 37°C for 20 hours.

| Reaction mixture: | | |
|---|---|---|
| β-chloro-L-alanine | 2.0 | g/dl |
| indole | 2.0 | g/dl |
| $Na_2SO_3$ | 0.2 | g/dl |
| EDTA | 0.2 | g/dl |
| pyridoxal-5-phosphate | 2 | mg/dl |
| pH (KOH) | 8.8 | |

Two grams of tryptophan were found in 100 ml of the reaction mixture.

When 2.0 g/dl L-serine were used in place of β-chloro-L-alanine, 1.85 g/dl L-tryptophan were accumulated.

EXAMPLE 5

Tryptophan in the medium of Example 1 was replaced with 2 g of 5-hydroxy-L-tryptophan, and Proteus morganii IFO 3848 was cultured in the medium as in Example 1.

The cells were collected by centrifuging tnd suspended in 1 l of 0.1% $NH_4Cl$—$NH_4OH$ buffer (pH 8.0) containing 20 g 5-hydroxyindole and 20 g β-chloro-L-alanine. The mixture was held at 37°C for 20 hours with stirring.

The reaction mixture contained 14.1 g 5-hydroxy-L-tryptophan.

By the same method as in Example 1, 7.5 g crystallini 5-hydroxy-L-tryptophan was recovered from the reaction mixture.

When β-chloro-L-alanine was replaced with 20 g L-serine, 13.6 g 5-hydroxy-L-tryptophan were found in the reaction mixture.

EXAMPLE 6

A culture broth of Proteus morganii IFO 3848 was prepared as in Example 1, 100 ml of the culture broth was mixed with 1 g 5-hydroxyindole, 0.2 g $Na_2SO_3$, 0.5 g $NH_4Cl$ and 1 g β-chloro-L-alanine, adjusted to pH 8.0 with ammonia water, and held at ambient temperature for 20 hours. The culture broth contained 0.88 g/dl 5-hydroxy-L-tryptophan.

EXAMPLE 7

In the procedure of Example 5, Proteus morganii was replaced with Erwinia herbicola ATCC 21433 or Aerobacter aerogenes ATCC 7256. ATCC 21433 produced 0.71 g/dl 5-hydroxy-L-tryptophan, while ATCC 7256 produced 0.41 g/dl 5-hydroxy-L-tryptophan.

EXAMPLE 8

Enzyme protein of Proteus morganii IFO 3848 was prepared as in Example 4, and 60 mg of the enzyme protein were added to the reaction mixture mentioned below.

| Reaction mixture: | | |
|---|---|---|
| β-chloro-L-alanine | 2.0 | g/dl |
| 5-hydroxyindole | 1.0 | g/dl |
| ammonium acetate | 1.0 | g/dl |
| $Na_2SO_3$ | 0.2 | g/dl |
| pyridoxal-5-phosphate | 2 | mg/dl |
| pH | 8.0 | |

The reaction mixture was held at 37°C for 20 hours. Then the reaction mixture contained 0.87 g/dl 5-hydroxy-L-tryptophan.

EXAMPLE 9

Cells of Proteus morganii IFO 3848 prepared as in Example 1 were suspended in 1 l of 0.1% NH$_4$Cl—NH$_4$OH buffer (pH 8.0) containing 20 g indole and 20 g β-bromo-L-alanine. The buffer was held at 37°C for 20 hours with stirring and contained 19.5 g 5-hydroxy-L-tryptophan.

EXAMPLE 10

β-Chloro-L-alanine in Example 5 was replaced with β-bromo-L-alanine, and 5.7 g 5-hydroxy-L-tryptophan were produced by the same manner as in Example 5.

What is claimed is:

1. A method for producing L-tryptophan or 5-hydroxy-L-tryptophan which comprises holding an aqueous mixture containing tryptophanase, indole or 5-hydroxyindole and β-halogenoalanine at 5° to 60°C until the indole or 5-hydroxyindole is converted to L-tryptophan or 5-hydroxy-L-tryptophan, and recovering the L-tryptophan or 5-hydroxy-L-tryptophan produced from the aqueous mixture.

2. A method as set forth in claim 1, wherein said tryptophanase is capable of causing reaction of serine with indole to L-tryptophan.

3. A method as set forth in claim 2, wherein said mixture further contains pyridoxal-5-phosphate.

4. A method as set forth in claim 2, wherein said mixture is held at 5° to 60°C and at a pH of 5 to 10 until said indole or 5-hydroxyindole is converted.

5. A method for producing L-tryptophan or 5-hydroxy-L-tryptophan which comprises holding an aqueous mixture containing cells of a tryptophanase-producing microorganism of genus Proteus, Erwinia, Escherichia, Pseudomonas or Aerobacter, indole or 5-hydroxy indole and β-halogenoalanine until the indole or 5-hydroxyindole is converted to L-tryptophan or 5-hydroxy-L-tryptophan, and recovering the L-tryptophan or 5-hydroxy-L-tryptophan produced from the aqueous mixture.

* * * * *